(12) United States Patent
Gill

(10) Patent No.: US 6,926,251 B2
(45) Date of Patent: Aug. 9, 2005

(54) FREE-FLOATING DIAPHRAGM FLOW CONTROL VALVE

(76) Inventor: Ajit Singh Gill, 4169 Bennion Rd., Salt Lake City, UT (US) 84119

( * ) Notice: Subject to any disclaimer, the term of this patent is extended or adjusted under 35 U.S.C. 154(b) by 0 days.

(21) Appl. No.: 10/962,968

(22) Filed: Oct. 12, 2004

(65) Prior Publication Data

US 2005/0067591 A1    Mar. 31, 2005

(51) Int. Cl.[7] .............................................. F16K 31/00
(52) U.S. Cl. ..................................... 251/291; 251/344
(58) Field of Search ............................... 251/291, 344, 251/343, 342, 4, 5; 137/625.33

(56) References Cited

U.S. PATENT DOCUMENTS

| | | | | |
|---|---|---|---|---|
| 2,509,671 A | * | 5/1950 | Christensen | 251/344 |
| 3,642,249 A | * | 2/1972 | Cruse | 251/344 |
| 4,049,018 A | * | 9/1977 | Skibowski | 251/344 |
| 5,782,455 A | * | 7/1998 | Burnworth | 251/343 |
| 5,979,492 A | * | 11/1999 | Miller | 251/344 |
| 6,196,477 B1 | * | 3/2001 | Halltorp et al. | 251/344 |

* cited by examiner

Primary Examiner—John Bastianelli

(57) ABSTRACT

A free floating diaphragm flow control valve includes concentric inner and outer bodies, where a partition plate divides the inner body into two equal inlet and outlet chambers. A cylindrical cavity, concentric with the inner and outer cylindrical bodies, provides space for a sheet diaphragm looping around a seat provided by the inner cylindrical body. The doubled up ends of the sheet diaphragm are held together by a tie assembly which has an integral bolt stem held that is shared with an actuator, which actuator, working in tandem with the pipe line's pressurized fluid around the diaphragm, can actuate the diaphragm's tied up ends, to open or close the diaphragm around its seat to control the fluid flow through the valve.

22 Claims, 15 Drawing Sheets

SECTION 2-2

SECTION 2-2

SECTION 1-1

SECTION 1-1

FREE-FLOATING DIAPHRAGM FLOW CONTROL VALVE

BACKGROUND OF INVENTION

1. Field

The invention is in the field of fluid control, shutoff valves, pressure reducing valves, pressure relief valves, and back flow check valves for pipe lines operating by means of elastomeric sleeve diaphragms.

2. State of the Art

The current types of elastomeric cylindrical sleeve diaphragm pressure reducing valves are manufactured by GROVE VALVES REGULATORS AND FLOW CONTROL SYSTEMS; and LYDCO INC. The two ends of these cylindrical sleeve diaphragms are fixed and tied down in the cylindrical cavities which-accommodate them. To operate these diaphragms, the elastomeric diaphragm sleeve is expanded by the pressurized fluid from the pipe system while its ends remains fixed, due to its ends being tied in a fixed place. For these valves, a minimum fluid pressure in the pipe line is required before the diaphragm sleeve will stretch and expand. These valves require that they be taken out of the pipe line whenever a sleeve diaphragm is replaced. These diaphragms cannot be strengthened with internal unstretchable reinforcement because the elastomeric sleeve diaphragm has to stretch. These elastomeric sleeve diaphragms are designed to control fluid flow through slots of very small size.

It is an object of this invention to provide an elastomeric partial cylindrical sleeve diaphragm fluid control valve, where the sleeve diaphragm can be pulled out of the valve body, and replaced, while allowing the valve body to remain in the pipe line. From here on an "elastomeric partial cylindrical sleeve diaphragm" or "diaphragm" will be understood to be a partial cylindrical sleeve diaphragm, having the form of a longitudinal rectangular elastomeric strip, which is mounted (wrapped) around a cylindrical seat in a valve body to control fluid flow through the valve, and which makes a loop around said cylindrical seat, where a portion of the seat always remains untouched by the sleeve diaphragm. The two ends of said strip are doubled up and tied to a stem of an actuator which can be operated (to go up and down) mechanically, hydraulically, pneumatically or with an electric motor. Thus the words or a group of words; "sleeve", "diaphragm", "sleeve diaphragm", "partial cylindrical elastomeric sleeve diaphragm", and "free floating elastomeric sleeve diaphragm", will also be used synonymously.

It is an other object of this invention to provide a valve in which, if required or desired, the partial cylindrical elastomeric sleeve diaphragm can be reinforced, for extra strength, to control fluid flow through much larger slotted openings through the seat of the diaphragm than can other valves.

It is an other object of the invention to provide a valve that can provide the dual functions of a shutoff valve, and a pressure relief valve, simultaneously, when the valve is used to block flow through the pipe line.

It is an other object of the invention to provide a valve in which an elastomeric diaphragm can damp out noise vibrations, which butterfly valves, gate valves, and ball valves cannot do.

It is an other object of the invention to provide a valve in which the opening and closing of the sleeve diaphragm can be controlled manually, by mechanical means, whereas sleeve diaphragms used in valves currently on the market cannot be controlled by any mechanical means.

It is an other object of the invention to provide a valve in which the opening and closing of the diaphragm means can be controlled by a piston means operated hydraulically.

It is an other object of the invention to provide a valve in which the opening and closing of the diaphragm can be controlled by a piston means operated pneumatically.

It is an other object of the invention to provide a valve in which a spring is provided to facilitate the closing and opening of the sleeve diaphragm.

It is an other object of invention to provide an air tight shut off valve by means of a partial cylindrical elastomeric sleeve diaphragm.

It is an other object of the invention to provide a valve in which a partial sleeve diaphragm allows the valve to be used as a back flow check valve.

It is an other object of the invention to provide a valve which can be used in combination with more than one type of actuators for different functions in the same pipe line.

Yet an other object of the invention is to provide an elastomeric sleeve diaphragm that can be produced more economically, by using the extrusion manufacturing method, whereas other diaphragms currently are produced by the molding method.

Yet an other object of the invention is to provide an elastomeric sleeve diaphragm valve, where the valve's actuator, unlike actuators used with butterfly and ball valves, is not subjected to any torque due to fluid flow.

Yet an other object of the invention is to provide an elastomeric sleeve diaphragm valve where the inner body of the valve can be exposed by rotating a part or parts of the outer cover of the valve about a hinge, or about two hinges.

SUMMARY OF THE INVENTION

According to the invention, a Free-Floating Diaphragm Flow Control Valve includes a cylindrical valve body, where its cylindrical inner portion Z1 and concentric outer portion cover 2 provide a cylindrical cavity 3 to accommodate fluid control means 4, conformed to a loop around its seat provided by the inner cylindrical portion Z1 of the valve body, to form a partial cylindrical free floating diaphragm 4. The diaphragm 4 in cavity 3 creates variable cavity 3C as a fluid pressure chamber between its outer surface 4T and inner surface 2B of cover 2, and it also creates a variable cavity that acts as a flow chamber for the fluid flow through the valve, between the seat 1A for the diaphragm 4 and the inner surface of the diaphragm 4S. The two longitudinal sides of the diaphragm are kept free for movement while remaining in contact with the two opposite radial walls of the valve body. The two short ends of the diaphragm are doubled up and tied together by means of a movable tie assembly. The tie assembly includes a bolt 7A which is shared with, and is held in common with, an actuator 8 located outside the valve body. The actuator can actuate the threaded portion of the bolt 7A along with the two tied up ends of the diaphragm by means of an integral elongated rectangular bolt head 7, which is held in common by the tie assembly and the actuator. The tie assembly tying the two ends of the diaphragm together is situated inside the receptacle enclosure box 5L, while the stem of said bolt passes through the lid 6 of the box into the driving nut 8 of the actuator located outside the open ended enclosure box 5L. The inner body of the valve includes a partitioning means 1 made of a cylindrical plate to divide the valve equally into an inlet chamber A and an outlet chamber B, and to divert the fluid radially from the inlet chamber A to the outlet chamber B, by passing fluid flow through a plurality of slotted openings means 1C, then passing it around the partition plate 1, and finally passing said fluid flow through the plurality of exit slotted openings means 1D, into chamber B. Thus, by providing two sets of openings 1C and 1D on both sides of the partition plate 1 in the inner cylindrical body Z1 of the valve, two fluidly communicative chambers A and B are provided. The valve is provided means to receive inlet flow into inlet chamber A, from the inlet pipe, along with means to expel outlet flow through outlet chamber B, through the outlet pipe. The valve also includes means to pressurize and depressurize fluid cavity 3C by means of opening 22B, where openings 22 and 22A from inlet chamber A and outlet chamber B, respectively, are connected to opening 22B through tubes or ducts, where said tubes or ducts include intermediary external needle, pilot, or shutoff valve or valves that might be used to give the valve its desired functionality.

A free-floating elastomeric partial sleeve diaphragm 4 is mounted in a cylindrical cavity 3, which cavity is provided in the space between a cylindrical seat 1A for the diaphragm (which seat is provided by inner cylindrical portion, Z1, of the valve), and the outer cylindrical valve body cover 2. The inner cylindrical portion of the valve is partitioned equally by means of a partitioning circular plate to create an inlet chamber A and an outlet chamber B. Each chamber is preferably a mirror image of the other. On each side of the partitioning means, near or next to the partition plate, a plurality of slotted openings, 1C and 1D, are provided for the passage of fluid flow. A partial section of the elastomeric diaphragm 4 encircles seat 1A which seat has slotted openings 1C and 1D.

Diaphragm 4, in its closed position, takes the form of a partial cylinder around the cylindrical seat 1A before its two opposite ends part away from the seat and converge outwardly, forming a neck of a loop, where the neck extends into a rectangular receptacle enclosure box 5L, wherein said two ends of the diaphragm are doubled up and tied together by means of a tie assembly. These said two ends of the diaphragm are also connected to a rectangular bolt head 7 of a stem 7A of an actuator. Thus, the stem 7A of the actuator, connected with the doubled up ends of the loop of the diaphragm (by means of said tie assembly), can be lowered or raised radially with respect to the center of the valve, to open the valve or to close the valve, respectively. By lowering the neck of the diaphragm toward the center of the valve by means of an actuator, the diaphragm is expanded around its seat to open the valve, and by pulling it outwardly, by means of said actuator, the diaphragm is closed around its seat to block the flow through the radial slots in the seat. A lid 6 is provided for said enclosure box 5L, which lid provides an opening means 6E (as shown in FIG. 9 and FIG. 11) for the exit of said stem 7A of said actuator. The lid 6 is held to said enclosure box 5L by means of bolts 6A driven into the opening walls of the enclosure box. Two types of actuators, "Type One" and "Type Two", are provided for diaphragm actuation, to provide specified functions for the valve. The common elements shared by these two types of actuators is a threaded end portion of a stem 7A, and a rectangular bolt head 7, of a bolt which is projected outside of said enclosure box 5L through an opening 6E located at the center of the lid 6 of the enclosure box. In a Type One actuator, the actuator stem 7A is moved up and down by means of a stationary rotatable longitudinal housing nut 8, which preferably provides an enclosure for protecting stem 7A from the environment. The housing nut is mounted around said threaded stem 7A. By rotating the housing nut 8, the threaded portion 7A of said bolt, and its head 7, which is tied to the two ends of the loop of the diaphragm 4, inside the enclosure box 5L, is radially moved up and down, to actuate the diaphragm of the valve, to control fluid flow through the valve. The radially downward movement of the tie assembly of the diaphragm 4, toward the center of the valve, expands the diaphragm 4 around its seat 1A to open the valve for fluid flow, and its radially up ward movement away from the center of the valve partially wraps the diaphragm 4 around its seat 1A, to shut off the flow of fluid through the valve. The diaphragm 4, inside the valve body, is operated in tandem with fluid pressure around the diaphragm, and is expanded open, or is contracted closed, around its seat, by means of one of two types of actuators. The two opposite free sides of the diaphragm strip 4 are provided with integral tube gaskets, 4G and 4H, where their outer sides 4J and 4K always remain in contact with the two opposite walls of the valve. Said seal gaskets are activated by the fluid pressure surrounding the diaphragm.

The inner valve body has cylindrical inlet and outlet interior chambers that are preferably mirror images of each other. The inlet chamber is separated from the outlet chamber by means of a circular partition plate. The cylindrical wall of each chamber is provided with a specified number of slotted openings 1C and 1D, with each slot having a specified area, and any desired shape (e.g. rectangular or circular), for the passage of fluid flow. The partitioning plate 1, between the two chambers A and B, blocks the inlet fluid and diverts it around partitioning plate 1, through the radial slots 1C and 1D in the cylindrical walls of the inlet and outlet chambers. The inlet chamber A receives fluid flow from the upstream pipe, which fluid flow is diverted radially around the partitioning plate 1, through the plurality of radial slotted openings 1C and 1D, and directed into the outlet chamber B. From there, fluid flows out of the valve and into the downstream pipe at the outlet of the valve.

To operate the diaphragm, cavity 3C is charged and pressurized through opening 22B, which is provided through the cylindrical cover of the valve, thereby creating pressure around diaphragm 4. The fluid is accessed through an opening 22 provided in the body of inlet chamber A, and openings 22 and 22B are connected through an intermediate external conventional needle valve or quarter turn shutoff valve V1. Opening 22B is connected to opening 22A at the outlet chamber B through an intermediate external conventional pilot control valve or quarter turn shutoff valve V2. The choice of the type of external intermediate conventional valves depends on the desired functionality of the invented valve. Cavity 3C can be depressurized and discharged by shutting fluid flow to cavity 3C, and by opening an external control valve V2 between openings 22B and 22A. The actuator that would be used with diaphragm 4 can be one that is operated manually, hydraulically, pneumatically, or with a motor. How the valve is operated will become clear from the descriptions of the drawings. The basic shutoff valve can perform more than one desired function by providing a suitable actuator and a means to pressurize or depressurize the diaphragm in the valve body, along with means to pressurize or depressurize the controlling actuator for the diaphragm, and a means to control the valve by means of an external intermediary control valve, such as a conventional needle valve or a pilot control valve. It is also understood that the operating of the valve by means of any actuator and other control means can include solenoid switches to synchronize the operation of the valve, to control the fluid flow through the valve. From here on, the terms "actuator", "housing nut", and "nut" will be used synonymously. The valve can be manufactured by casting, fabrication, machining, or by any combination of current manufacturing techniques. At appropriate locations, seal gaskets are provided to prevent leaks through the valve body. The valve can be made of metal or plastics or a combination of these materials.

THE DRAWINGS

In the accompanying drawings, which illustrate the best mode presently contemplated for carrying out the invention:

DETAILED DESCRIPTION OF THE ILLUSTRATED EMBODIMENT

Figure 1:
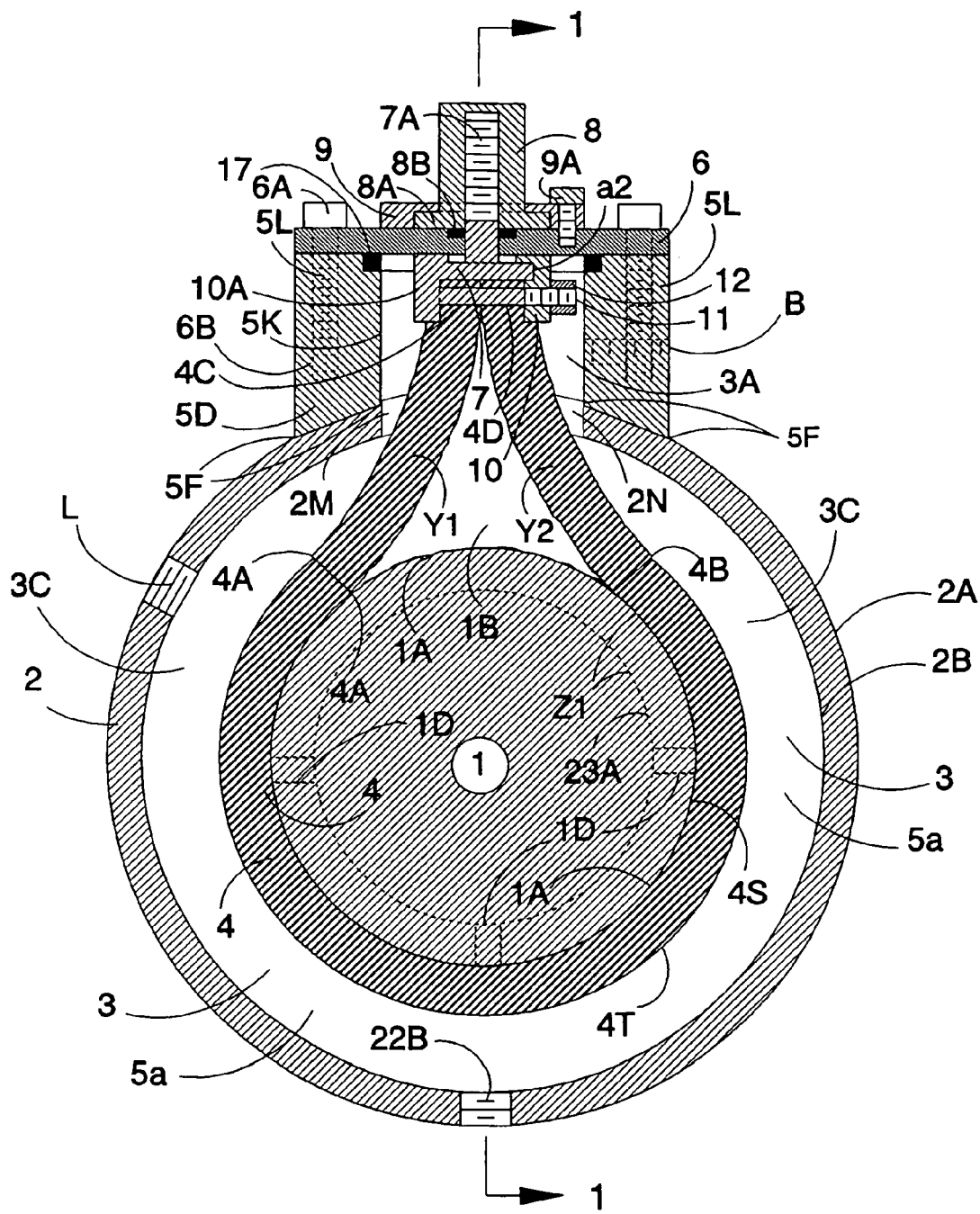
FIG. 1 is a transverse vertical section taken on line 2—2 in FIG. 2, and shows the valve, along with a Type One actuator.
Figure 2:
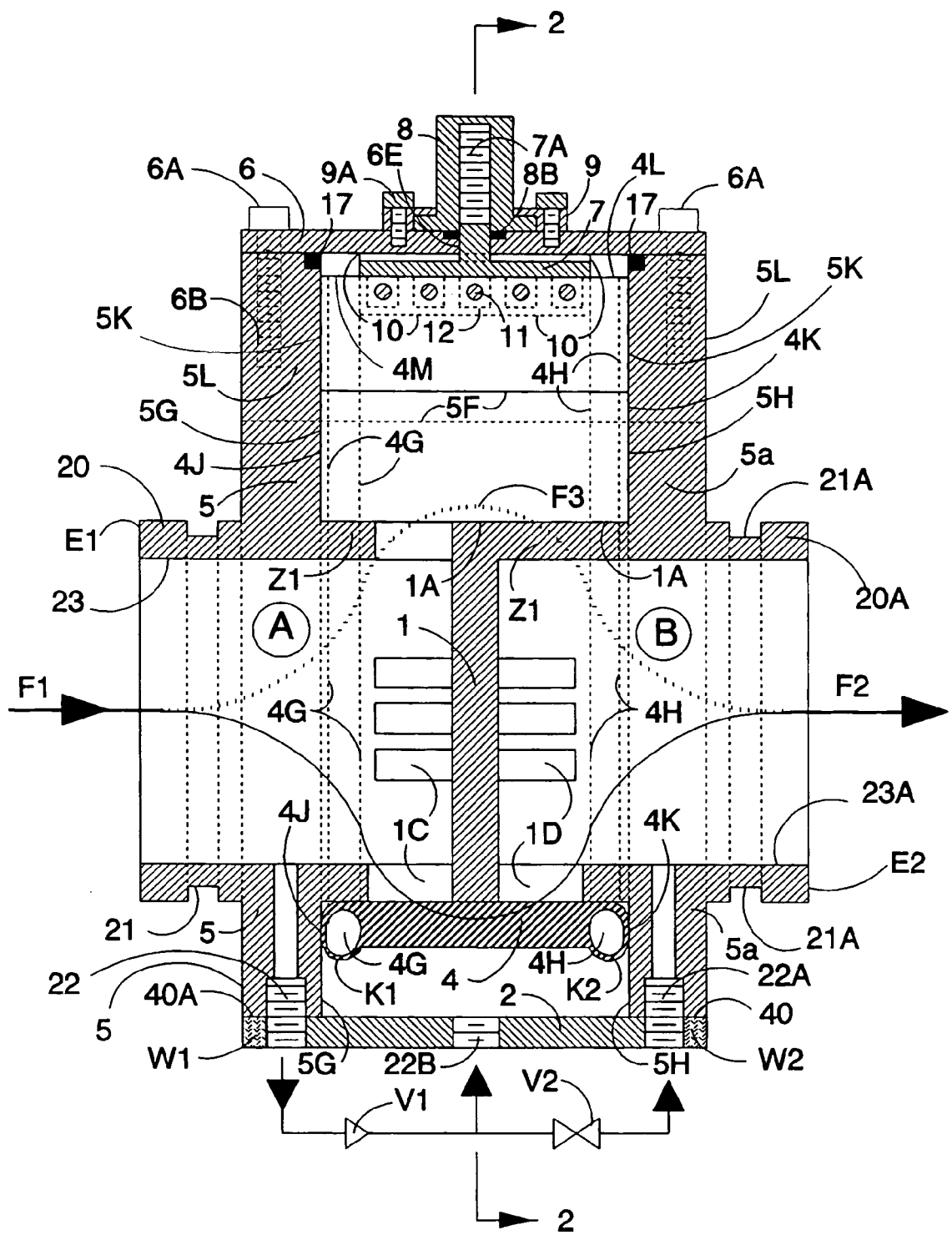
FIG. 2 is an axial vertical section taken on line 1—1 in FIG. 1.
Figure 10:
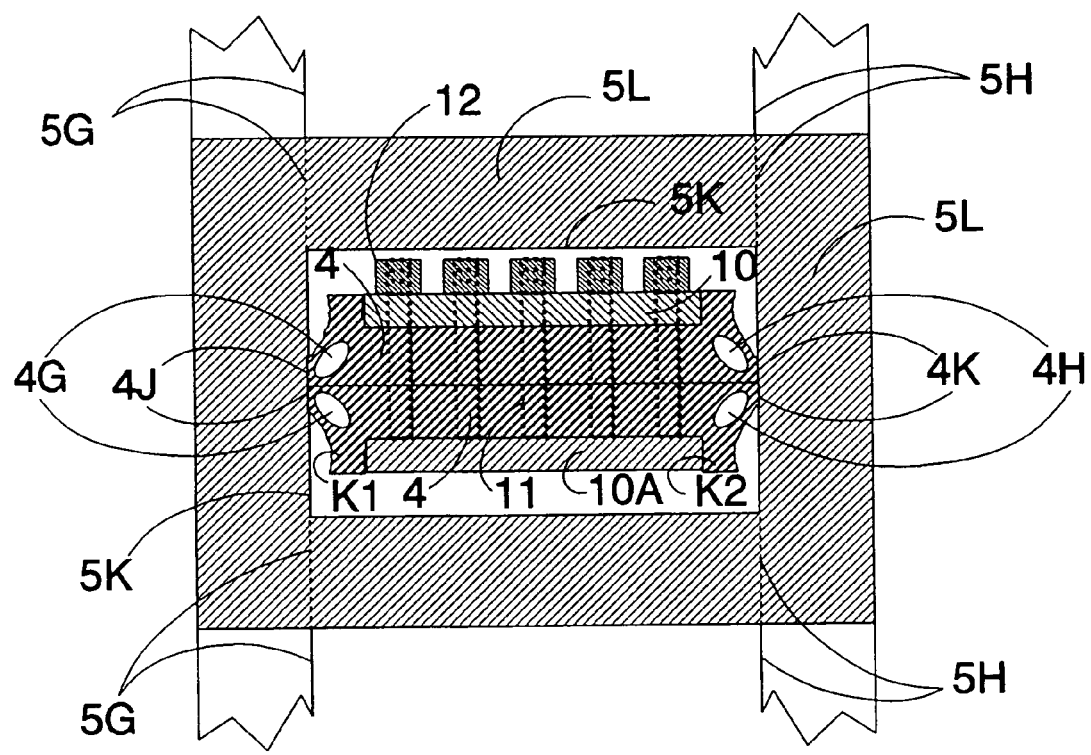
FIG. 10 is a transverse section through the doubled up diaphragm of FIG. 1, taken between bolt head 7 and tie bolts 11, looking toward the center of the valve, and showing the relative positions of the tie assembly and the diaphragm inside the enclosure box.

The drawings for the embodiment are not drawn to any particular scale. The cylindrical portions of the valve body are concentric to the axis of the valve. The valve receives fluid through inlet 23 from an upstream pipe (not shown) and delivers fluid flow, through outlet opening 23A, to a down stream pipe (not shown). The valve may be connected to the inlet and outlet pipes with conventional groove couplings by means of two grooves 21 and 21A, or with conventional flange connectors, or one end of the valve may be connected to pipe with a groove coupling while the other end of the valve may be connected by a flange connector, or the two ends E1 and E2 may be welded to the inlet and outlet pipes. Because all of the figures are derived from one basic figure; FIG. 1, they can all be studied together. FIG. 1, FIG. 2 and FIG. 10 will now be described together. FIG. 10 depicts another version of the gasket seals, on two sides of the diaphragm 4, and also depicts their relationship in their doubled up and tied position. Inlet and outlet portions 20 and 20A, outside the valve body, may be extended to provide openings to access fluid from 23 and 23A respectively, and they may also be connected to opening 22B, as will be explained later.

Figure 9:
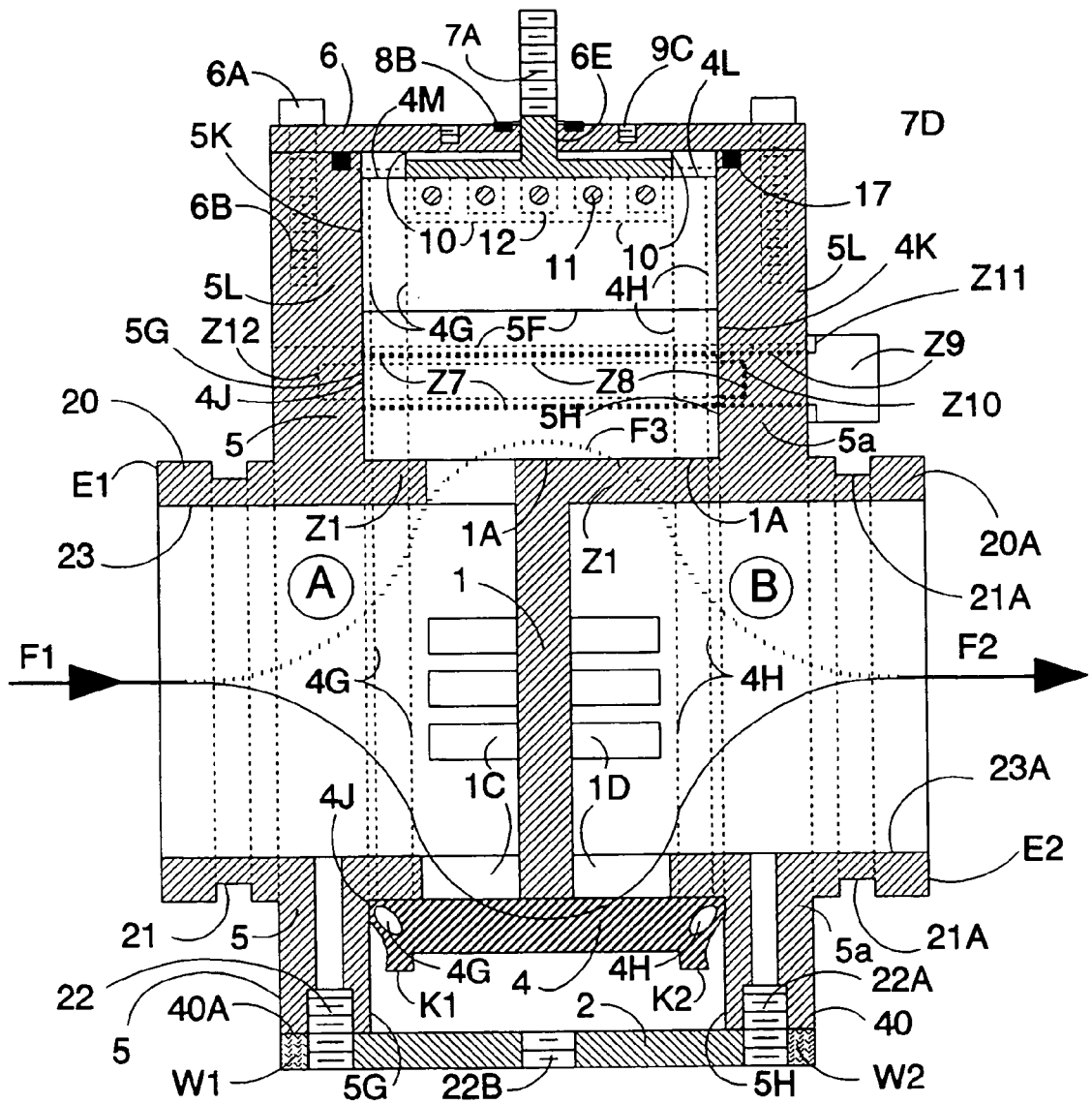
FIG. 9 is similar to FIG. 2, but the drive for the tie assembly is not shown, and the adjustor rollers, used to adjust the gap between the converging portions of the diaphragm, are depicted.
Figure 12:
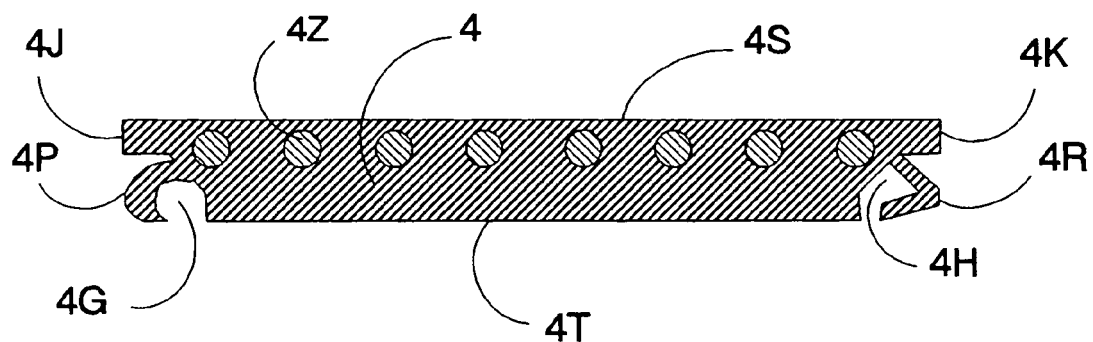
FIG. 12 shows a vertical cross section of an alternate design of the sheet diaphragm having two different types of seals in its opposite sides.
Figure 13:
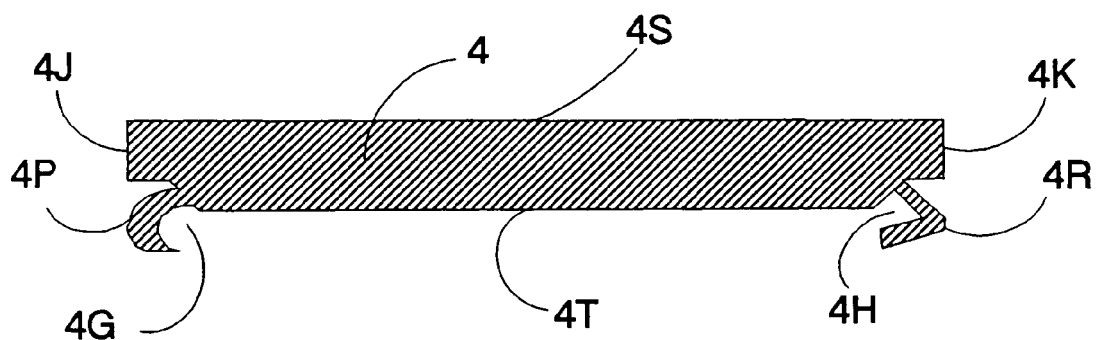
FIG. 13 shows a modified design of the diaphragm shown in FIG. 12.

FIG. 1 and FIG. 2 show partition means plate 1 which divides the valve into two preferably equal parts and creates two chambers A and B, where each chamber is a preferably a mirror image of the other. The inner surfaces of chambers A and B are shown as 23 and 23A, respectively. The interior cylindrical wall Z1 of the inner valve body, between two radial walls 5 and 5a, provides cylindrical seat 1A for an elastomeric diaphragm flow control means 4 to control the fluid-flow around circular partitioning plate 1 and cylindrical seat 1A. The cylindrical section Z1 providing seat 1A for the diaphragm 4 is provided with radial slots 1C and 1D for the passage of fluid flow through the valve around partitioning plate 1. Diaphragm 4 makes a loop around seat 1A, and is placed in cylindrical cavity 3, which cavity 3 is created between cover wall 2 and seat 1A and two opposite radial walls 5 and 5A including the opposite walls of the enclosure box 5L. It is pointed out here that cavity 3C will always be considered to include cavity 3A, inside the enclosure box. The free ends 4J and 4K of the diaphragm 4, shown in FIGS. 2, 9 and 10, always remain in contact with opposite inner surfaces 5G and 5H of said radial walls 5 and 5A, and with opposite inner surface 5K of the enclosure box 5L. It is also pointed out here that various designs of integral seal gaskets in the sides of diaphragm 4 are possible; two more alternate designs in FIGS. 12 and 13 are shown. Depending on the thickness of diaphragm 4, sides K1 and K2 may or may not protrude beyond the thickness of diaphragm 4. For simplicity in the drawings, a solid line for K2 (which should appear) around 4T in the FIGS. is not shown, and some dotted hidden lines are also omitted. The tube cavities 4G and 4H may be circular, or of any other configuration, as depicted in FIGS. 12 and 13. The tubes 4G and 4H in FIGS. 2, 9 and 10, are always charged with the fluid from cavity 3A around the diaphragm in the receptacle enclosure box 5L. In the doubling up of the ends of diaphragm 4, the open ends of tubes 4G and 4H in FIG. 2 are depicted by 4L and 4M, which are situated in the enclosure box at the ends of longitudinal bolt head 7 and tie plate 10.

Figure 8:
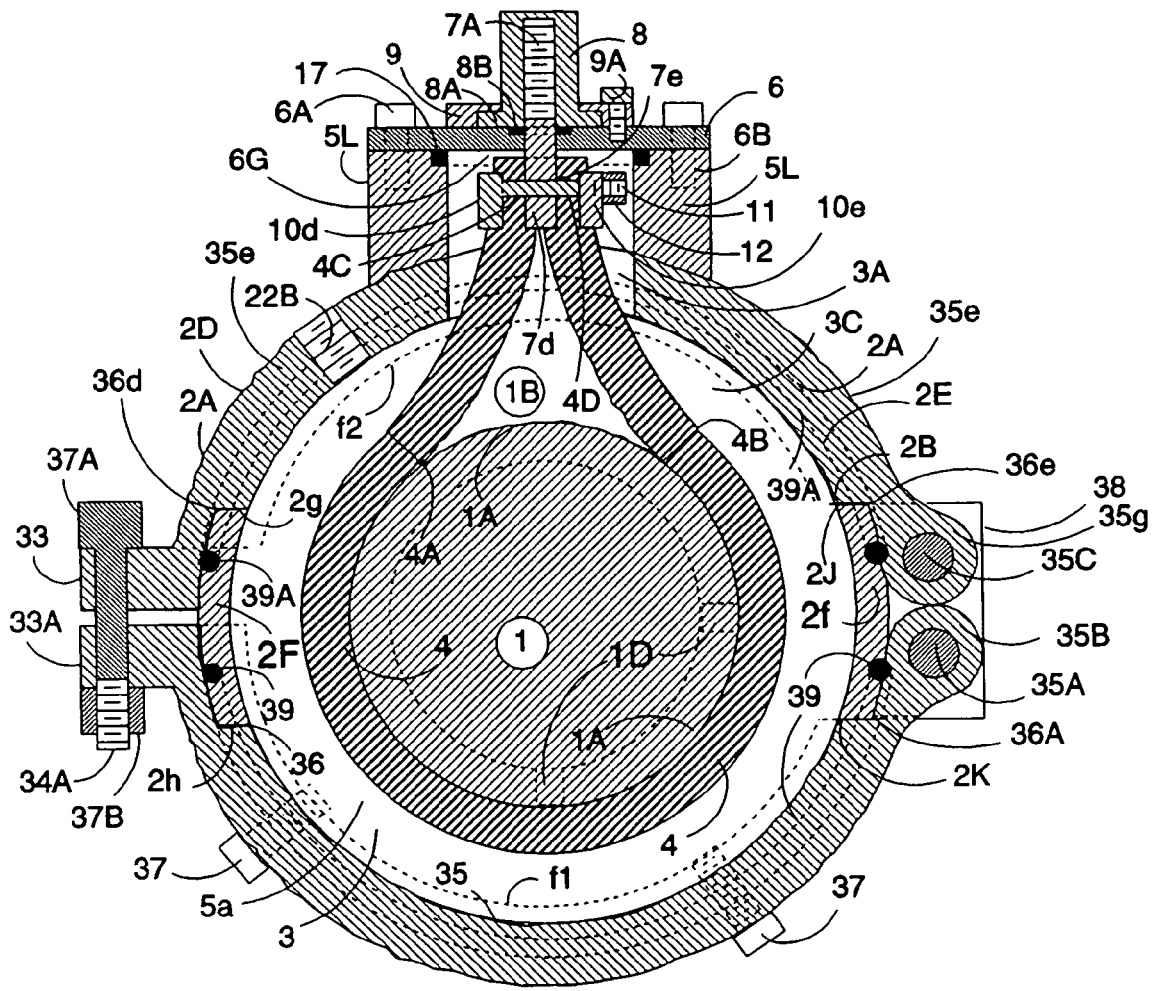
FIG. 8 is similar to FIG. 7, except that two split arcuate covers are provided for the valve, which covers can be swung apart to expose the inner cavity of the valve.

The integrated tie assembly (which can be constructed using various methods) is comprised of integral parts 7, 7A, 10A, and 11, along with a separate tie plate 10. Though said integral parts 7, 7A, 10A, and 11 collectively comprise one large integrated part, they can also be regarded separately for each part's unique contribution to the functionality of the integrated tie assembly. Said integral part 7, while being fully integrated with parts 7A, 10A, and 11, can also be thought of as a longitudinal rectangular "bolt head" for threaded stem 7A. Said integral part 10A, while being fully integrated with parts 7, 7A, and 11, can also be thought of as a plate that acts as the "bolt heads" of a plurality of threaded cross bolts 11. The integrated tie assembly also includes a separate tie plate 10 which is used to tie together the doubled up ends of diaphragm 4, through the use of a plurality of nuts 12 used on the said plurality of cross bolts 11. Threaded stem 7A, while being an integral part of the tie assembly, also acts as part of the actuator driving mechanism. The integrated tie assembly, as just described, is shown in FIGS. 1, 2 and 10, and in all other FIGS. except FIG. 8. A modified version of the tie assembly is shown in FIG. 8, and will be described in the detailed description of FIG. 8.

The Diaphragm 4 is partially wrapped around seat 1A in cylindrical cavity 3. When diaphragm 4 is in its expanded open position, fluid flow F1 enters inlet 23 of interior inlet chamber A, from the inlet pipe (not shown), where it is diverted radially by means of partitioning plate 1 and exits chamber A through the plurality of radial exit slots 1C, and passes around partitioning means 1 between seat 1A and diaphragm 4, and then enters into interior outlet chamber B by means of radial slots 1D, and then exits through outlet chamber B, as flow F2, out of the valve body and into the down stream pipe (not shown) at the outlet 23A of the valve. The inner and outer surfaces of diaphragm 4 are indicated by 4S and 4T respectively.

An open ended rectangular receptacle enclosure box 5L is provided to accommodate the above explained tie assembly of the diaphragm loop. The enclosure box provides an opening that can be used to remove an old, worn out, diaphragm, and to replace it with a new diaphragm when necessary. The base of receptacle box 5L is depicted by 5F. From here on the "receptacle enclosure box", "enclosure box", or "box" will be used synonymously. The inner surface of box 5L is shown by 5K.

How elastomeric diaphragm 4, having the form of a long rectangular strip, is installed around seat 1A will be explained now: Shown in FIG. 1, the two end portions of diaphragm 4 are provided with a plurality of openings 4C and 4D for the passage of a plurality of bolts 11, which bolts are integrated with tie plate 10A, as shown in FIG. 10. One end of elastomeric diaphragm 4 is pulled through cavity 3, around seat 1A, by means of a nylon fishing string (or any other type of string, rope, or wire) strung or tied to one end of diaphragm 4. Two ends of diaphragm 4 are aligned and doubled up inside of box 5L, and are tied together by means of the before described integrated tie assembly.

Once the doubled up ends of the diaphragm are secured inside the tie assembly, stem 7A is then passed through corresponding opening 6E (shown in FIGS. 4, 9 and 11) at the center of lid cover 6, and lid 6 is mounted over enclosure box 5L by means of a plurality of bolts 6A, by driving their threaded portions 6B into the open walls of box 5L. Once lid 6 is secured to enclosure box 5L, the actuator assembly is then fixed in place, to drive stem 7A radially up and down. The actuator of Type One, shown in FIG. 1, includes a longitudinal nut 8, with circular flange 8A, mounted around bolt stem 7A, and a cap means 9 that holds flange 8A rotatably in place. Also included in said Type One actuator is a plurality of bolt means 9A to hold cap 9 to lid 6. This actuator is used to actuate bolt head 7, and, through it, to also actuate the rest of the integrated tie assembly, and the diaphragm. It does this by acting on bolt head 7 through threaded stem 7A, which stem is part of the actuator driving mechanism. Bolt head 7 is an integral part of the tie assembly situated in the enclosure box 5L, and threaded stem 7A of the bolt acts both as a stem of the actuator, and as part of the tying mechanism of the tie assembly. When the tie assembly, which holds together the doubled up ends of diaphragm 4 inside of enclosure box 5L, is acted upon by actuator 8 working through stem 7A and bolt head 7, diaphragm 4 is also simultaneously actuated, and moves either up or down.

Figure 4:
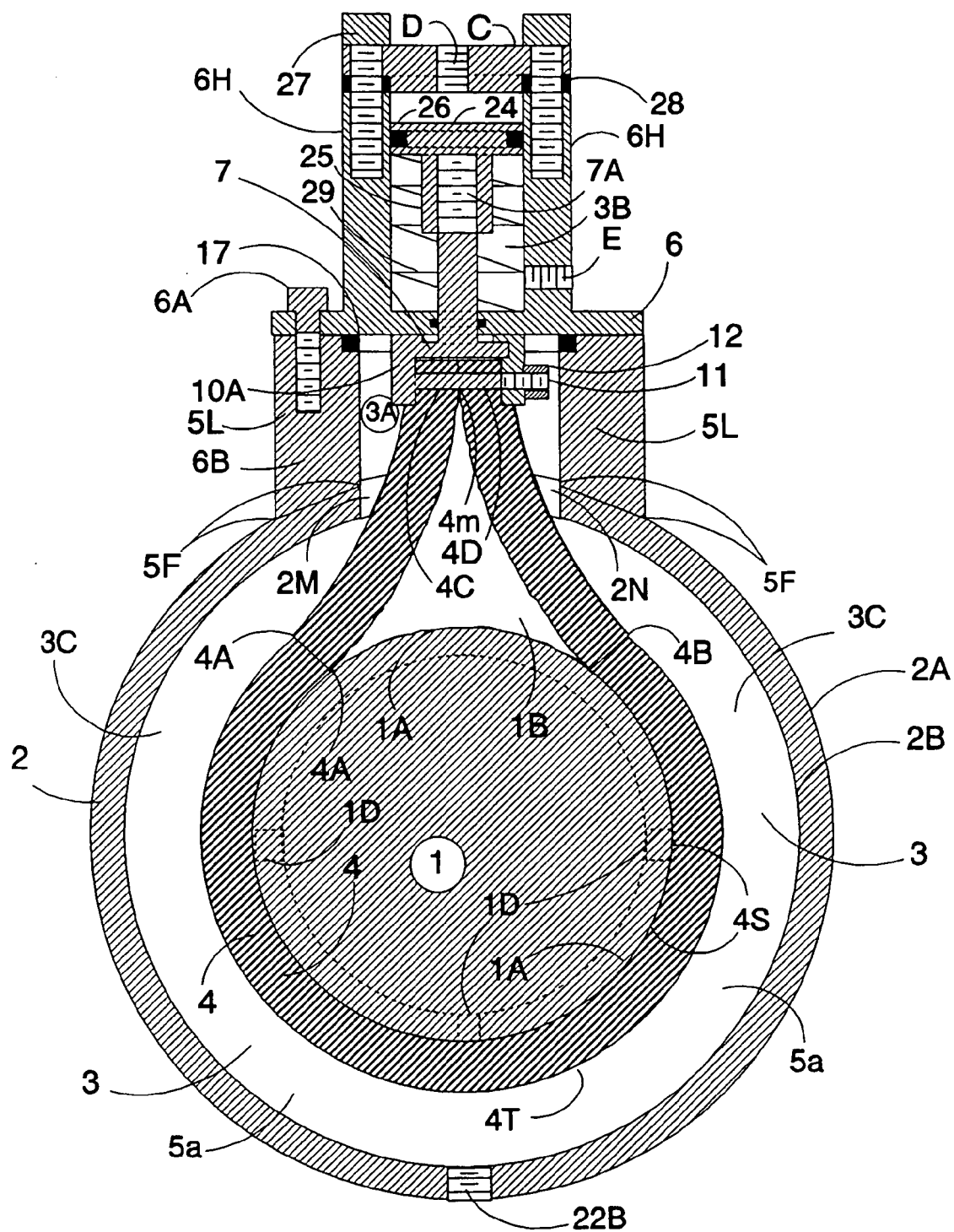
FIG. 4 is similar to FIG. 3, except that openings 19 and 20 are eliminated.
Figure 11:
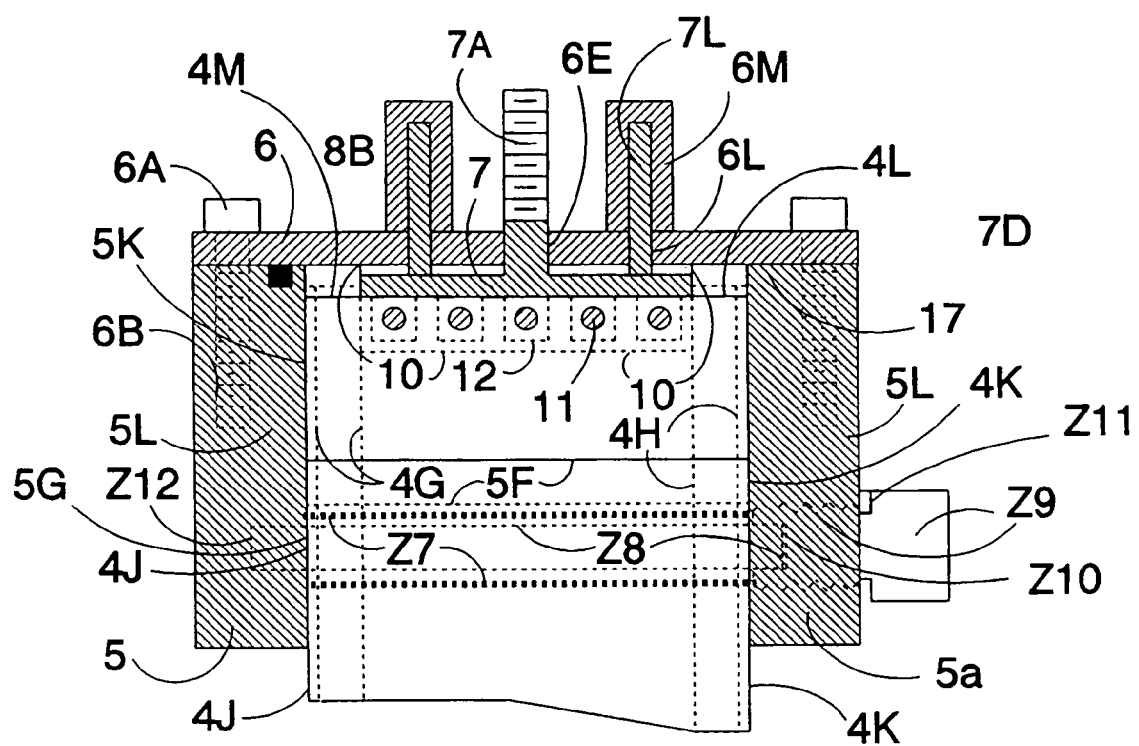
FIG. 11 is similar to FIG. 9, except that extra guide arms, provided for the tie assembly, are shown.

The gap between two converging end portions of diaphragm 4, beyond sections 4A and 4B, can be widened or narrowed, as desired, by means of two adjustor rollers Z5 and Z7 depicted in FIGS. 4, 9 and 11. Cavity 3C is kept communicative with cavity 3A of the enclosure box 5L. Hereafter, unless cavity 3A is called upon to describe enclosure box 5L, cavity 3A will always be considered to be part of cavity 3C, between diaphragm 4 and outer valve cover 2. Diaphragm 4 in FIG. 1, and in all other FIGS., is shown in a closed shutoff position. When stem 7A, along with the integrated tie assembly, including bolt 11, is driven downward by the counter clock wise rotation of longitudinal bolt means 8, the diaphragm 4 around cylindrical seat 1A expands away from the seat and allows the passage of fluid flow through the valve body through the slotted opening means 1C and 1D. When stem 7A and said tie assembly is driven far enough upward, by the clock wise rotation of bolt 8, diaphragm 4 closes around seat 1A to shutoff slots 1C and 1D, and no passage of fluid flow is possible through seat 1A to the downstream pipe. Openings 22 and 22B are provided to charge cavity 3C with fluid from inlet chamber A, and an external needle valve or quarter turn shutoff valve V1 is placed between openings 22 and 22B. Similarly, cavity 3C can be discharged of fluid by means of a pilot control valve or quarter turn shutoff valve V2 in a duct between openings 22A and 22B. Thus the pressure of fluid around diaphragm 4 can be increased or decrease to close or to open the valve respectively. The openings 22, 22A and 22B can be situated in any other suitable sections of the valve, including being situated close to the enclosure box 5L. It is pointed out here that the end sections 20 and 20A can be lengthened for the purpose of situating openings 22 and 22A outside of walls 5 and 5a.

When the valve is in the closed position, fluid is trapped in cavity 1B, which is created between the converging legs, Y1 and Y2 (of diaphragm 4), and seat 1A. This fluid balances the pressure that is exerted against the diaphragm by the fluid that is in cavity 3C. To open the valve, the fluid in cavity 3C is discharged, by opening the external valve V2 between openings 22A and 22B which depressurizes cavity 3C. The valve can then be opened, by means of the actuator, to the desired extent. The valves depicted in FIG. 5 to FIG. 8 can be opened in this manner. The diaphragms of these shutoff valves may not be reinforced. A predetermined amount of stretch of the diaphragm material is allowed, under certain differential pressure around the diaphragm. FIG. 8 depicts a gap 6G, of predetermined size, that is provided between cover 6 and the modified tie assembly, to balance the fluid pressure around diaphragm 4 to the maximum extent. Though not shown, a similar gap can be provided between lid 6 and the tie assembly shown in all other FIGS.

It is understood that at least one slot of 1C, can preferably be provided so as to open into cavity 1B, between Y1 and Y2, to facilitate two things: First, it can allow cavity 1B to be more quickly charged, to assist in opening the diaphragm away from seat 1A with the least required force. Second, in the case where the valve is used in its back flow shutoff (check valve) configuration, as described with FIG. 3 below, it can allow cavity 1B to be discharged, to make backflow shutoff happen more quickly.

Cover wall 2 may be constructed by welding a cylindrical tube to outer ends 40 and 40A of walls 5 and 5a, by creating welds W1 and W2, as shown in FIG. 2. Alternatively, cover wall 2 may be cast integrally with the body of the valve. Seal gaskets, used to prevent fluid leak from the valve body, are shown as 17 and 8B.

Figure 3:
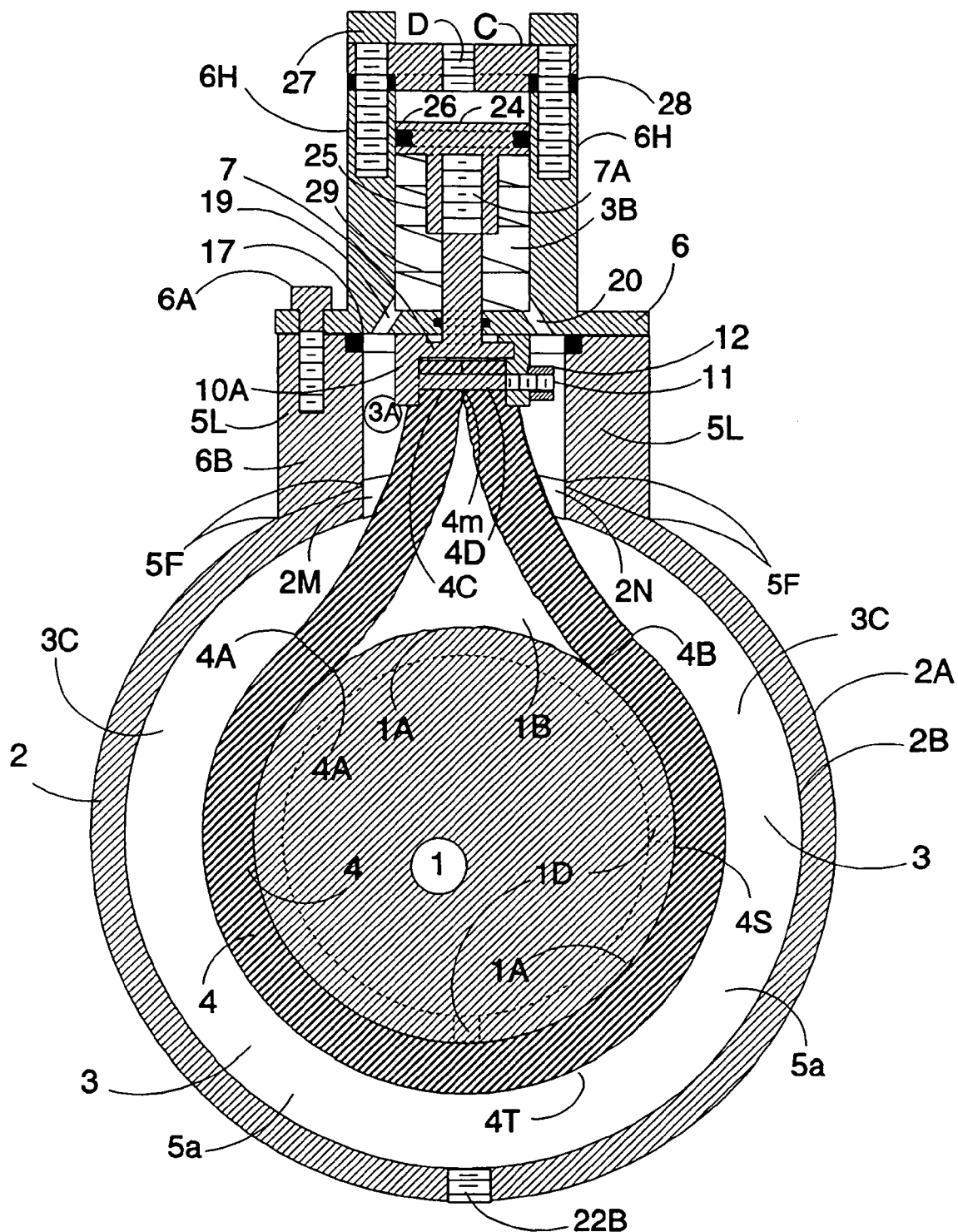
FIG. 3 is similar to FIG. 1, except that the valve is provided with a Type Two piston actuator, which actuates the diaphragm.
Figure 15:
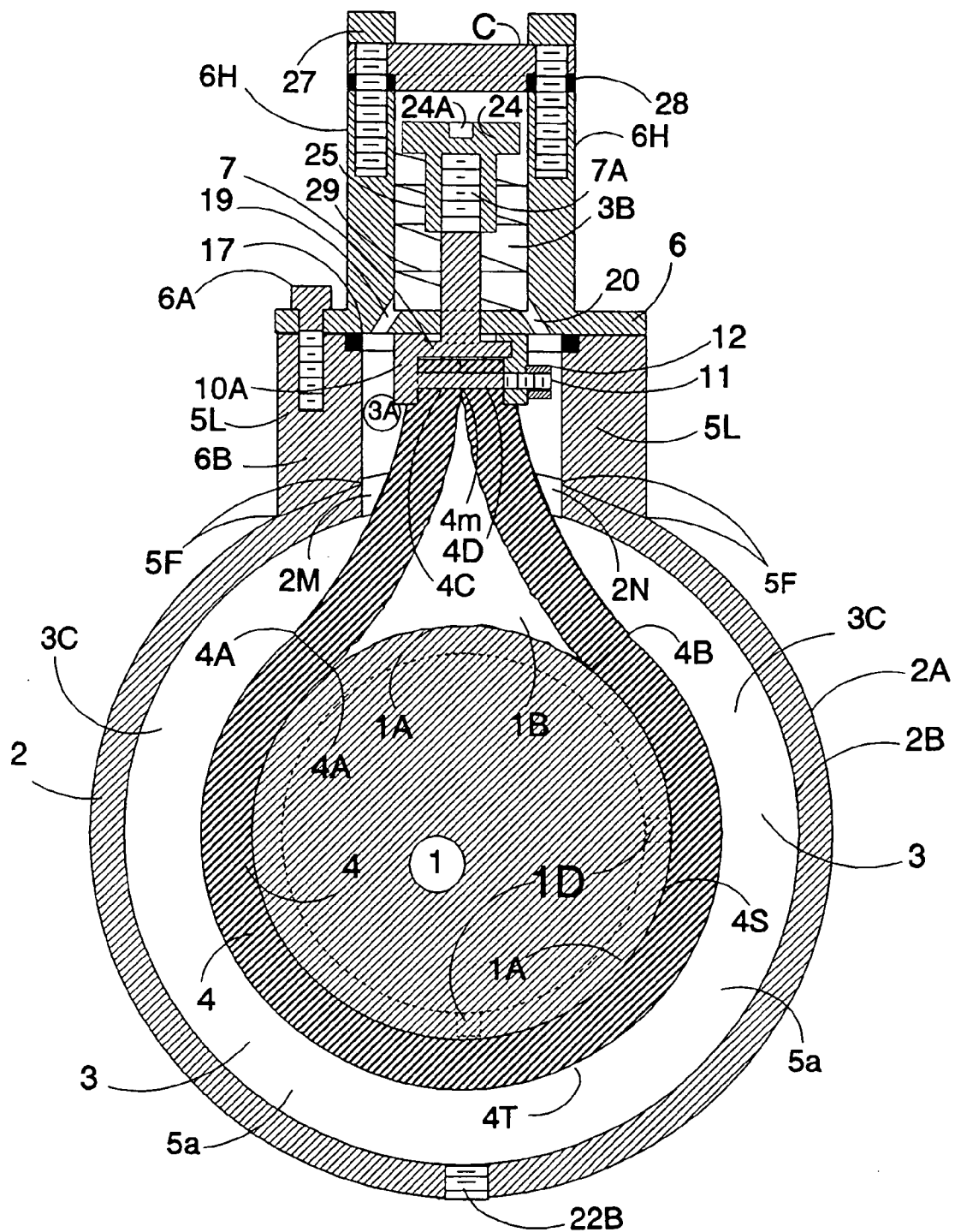
FIG. 15 is a modified version of FIG. 3.

FIG. 3 is the same as FIG. 1, except that the actuator is a Type Two actuator. The base of the cylindrical actuator 6H is integrated with cover 6, and cover 6 is held to 5L by means of bolts 6A, as it is in FIGS. 1 to 8. The term "cylindrical housing" will hereafter also be used to refer to actuator 6H. Piston 24 is mounted around stem 7A by means of an integral cap nut 25 against a spring 29 of predetermined strength. Seal gaskets 26 and 28 are provided against fluid leakage. Cavities 3B and 3A, and cavity 3C around the diaphragm 4, are fluidly communicative. Threaded opening D is provided, which can be used for a bolt drive to open the valve when cavity 3C is being depressurized. As shown in FIG. 15, it is understood that piston 24 in all FIGS. would be provided key hole 24A for a key wrench to mount the piston around stem 7A and to disengage the piston from 7A.

There are three options available in the use of the valve of FIG. 3. Under the first option, the valve is operated strictly as a shut of valve. In this case, openings 22, 22A, and 22B are kept opened, and a shut off valve V2 is used between openings 22A and 22B. When there is no flow, spring 29 keeps the diaphragm in its closed position, through its upward force, as shown in FIG. 3. The valve will open only when a predetermined pressure is achieved in the upstream pipe line. To close the valve, the shutoff valve V2, between 22A and 22B, is turned off, to charge cavity 3C and 3B. The unbalanced resulting pressure, due to the pressure in 3C added to the pressure on the diaphragm caused by the upward force of spring 29, both working against the pressure in the interior of the diaphragm, causes diaphragm 4 to close around seat 1A and to shut off the valve. The threaded opening D in cover C can be used for a bolt drive to open the diaphragm by moving piston 24 and the tie assembly toward the center of the valve.

Under the second option of FIG. 3, the valve is operated as back flow check valve. In this case, opening 22 is kept closed, and openings 22A and 22B are kept fluidly communicative. The valve opens when a predetermined up stream fluid pressure is achieved in the pipe line. Reverse flow in the valve is shut off when the reverse flow pressure itself pressurizes cavities 3C, 3A and 3B, and when the resulting pressure, added to the pressure on the diaphragm exerted by spring 29, causes diaphragm 4 to close around seat 1A.

Under the third option of FIG. 3, the valve can be operated as a pressure reducing valve, by operating it with conventional needle and pilot control valves. In this case, a conventional needle valve V1 is installed in the tube connecting openings 22 and 22B, and a pilot control valve V2 is installed in tube connecting openings 22B and 22A. It is pointed out here that a possible, yet very minor, transfer of two way fluid leakage through gaskets K1 and K2, which would allowing a very small amount of fluid leakage between the inside of the diaphragm loop and the outside of the diaphragm loop, during the operation of the valve, does not impair the functionality of the valve. The diaphragm, operated in tandem with the pilot control valve and the needle valve, adjusts quickly to any fluid pressure change around the diaphragm. The optional openings in wall 6H, or at any other locations can be provided for a pressure gage or for other functions. When the valve is being shut off, the operator keeps his or her eye on the pressure gage, so as not to close the valve too fast. If surge pressure start to rise, the operator stops and waits before the operator starts closing the valve again.

FIG. 4 is the same as FIG. 3, except that openings 19 and 20 are eliminated, to isolate cavity 3B of the actuator from cavities 3A and 3C. Thus the actuator can be actuated, by means of openings D and E, pneumatically.

Figure 5:
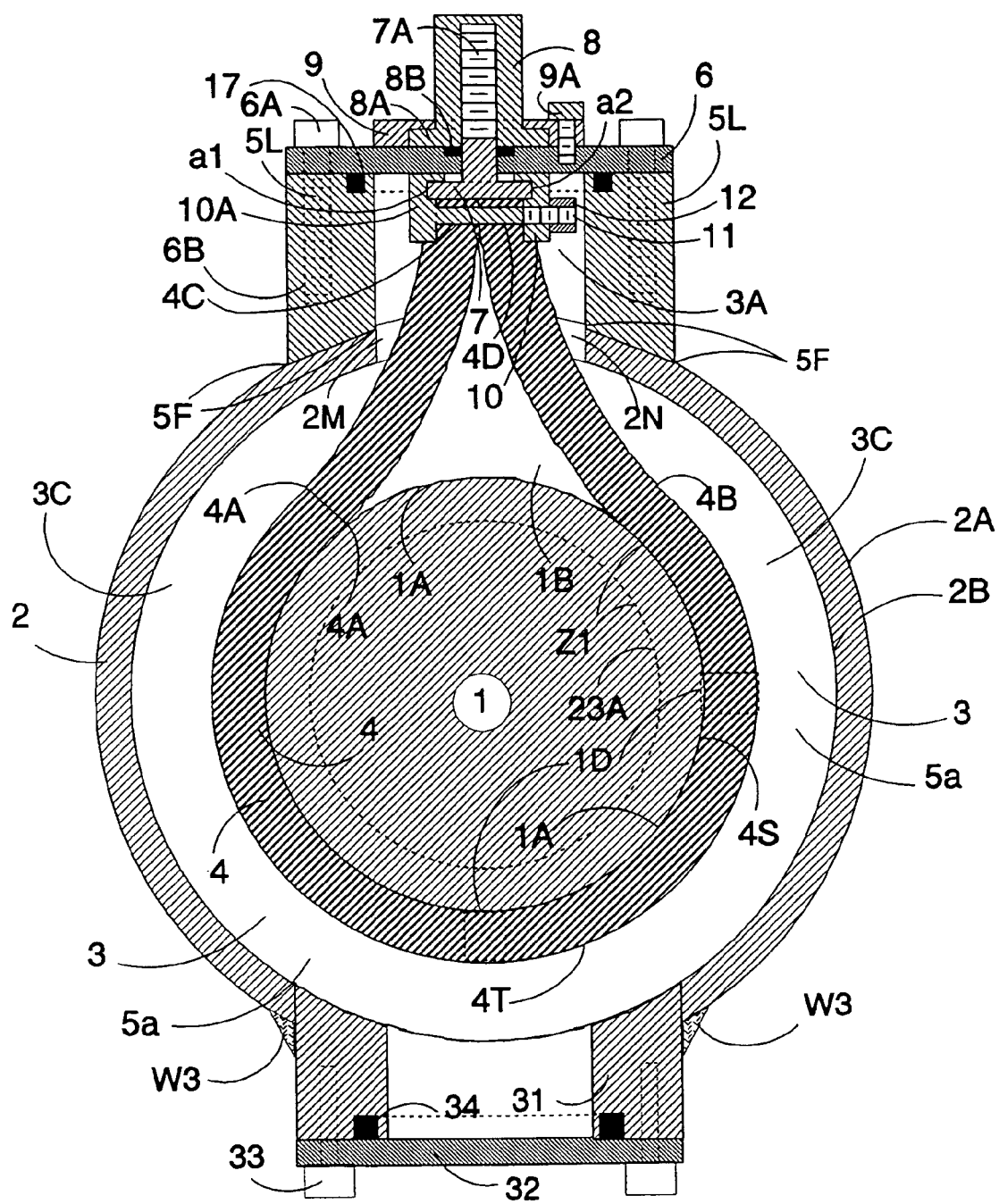
FIG. 5 is similar to FIG. 1, except that an extra opening, covered by a lid, is provided on the side of the valve that is opposite the enclosure box.

FIG. 5 is similar to FIG. 1, except that an extra rectangular box opening is provided opposite to the enclosure box 5L. The walls of the access opening, to the interior of the valve, are shown by 31. A cover plate 32 is tied to walls 31 by means of threaded bolts 33 which are driven into open walls 31. The walls 31 may be integrally cast with the outer body 2 of the valve, or they can be integrated with the valve body by means of welding W3. Seal gasket 34 is provided to prevent any leakage of fluid through the wall 31. The rest of the valve was explained previously.

Figure 6:
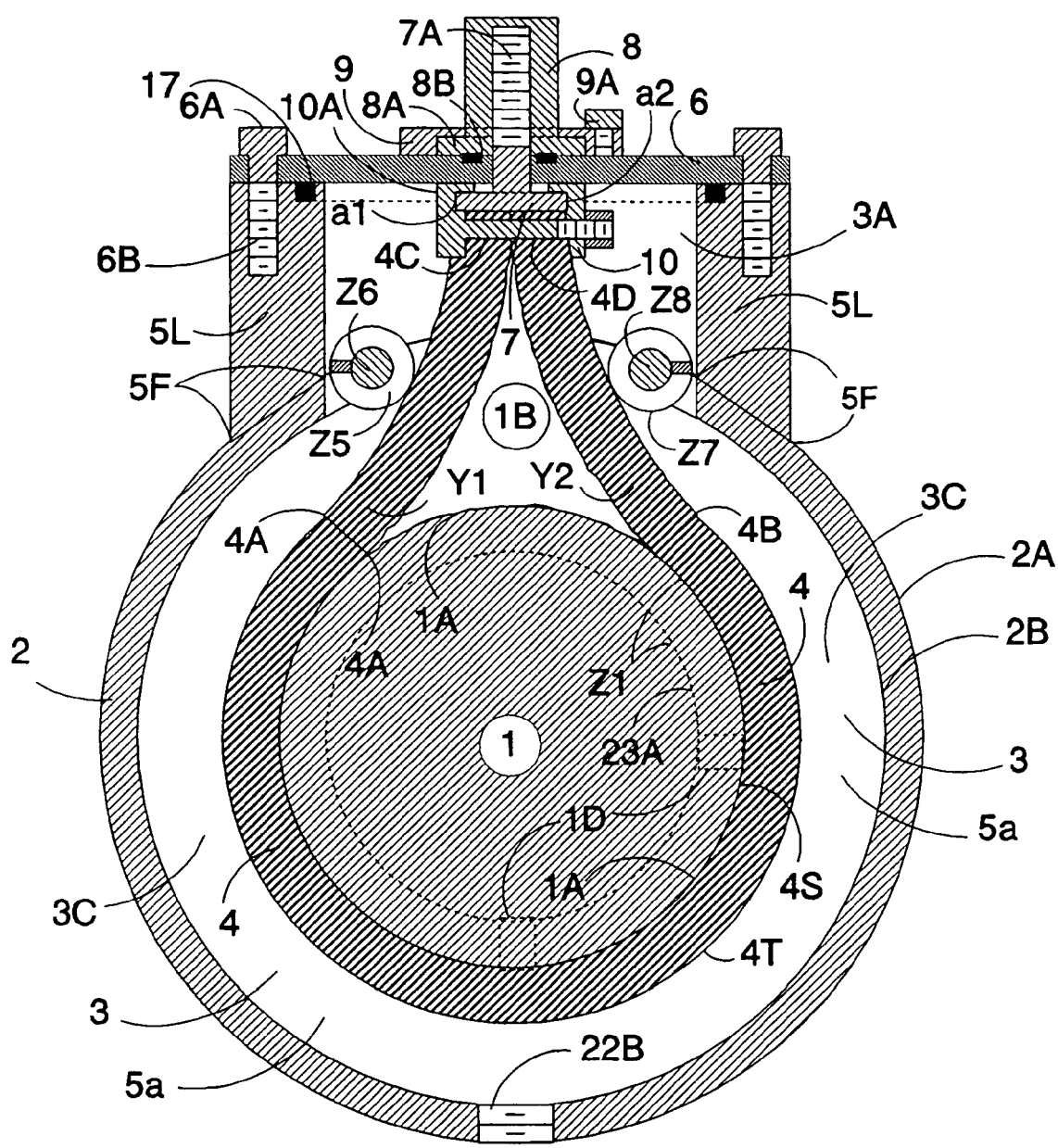
FIG. 6 is similar to FIG. 1, except that two adjustor rollers, used to adjust the diaphragm, are included in this FIG.

FIG. 6 is similar to FIG. 1, except that two identical adjustor rollers, to adjust diaphragm 4 around seat 1A, are included in FIG. 6. The longitudinal view of one roller is presented in FIGS. 9 and 11. These rollers will work with or without protruded sides K1 and K2. The rollers are comprised of helix springs Z5 and Z7 mounted around rod Z6 and Z8 repectively, where the length of the rod in a roller is longer than the length of the spring. In FIG. 9, the two ends of spring Z7 are shown to extend between two opposite walls 5 and 5a, where one end of rod Z8 is mounted in the corresponding hole Z12 and its opposite end is mounted in the corresponding hole Z10 provided in the threaded stem of a bolt Z9. The gaps between each helix spring coil provide passage of fluid as well, which keeps cavities 3C and 3A fluidly communicative in the case where the narrowness of enclosure box 5L provides no space between wall 5L and diaphragm 4. The first function of the rollers is to position portions Y1 and Y2, of diaphragm 4, in such a manner as to create a desired gap between Y1 and Y2, to assure that the desired number of the slots in seat 1A will be closed when the diaphragm is in closed position. The second function of the rollers is to ease the opening and closing of the diaphragm. Once the tie assembly has tied up diaphragm 4, by doubling up and securing the two ends of diaphragm 4, then each one of the two opposite rollers, shown in FIG. 6, is mounted through its corresponding threaded opening, which is provided for its bolt Z9.

Figure 7:
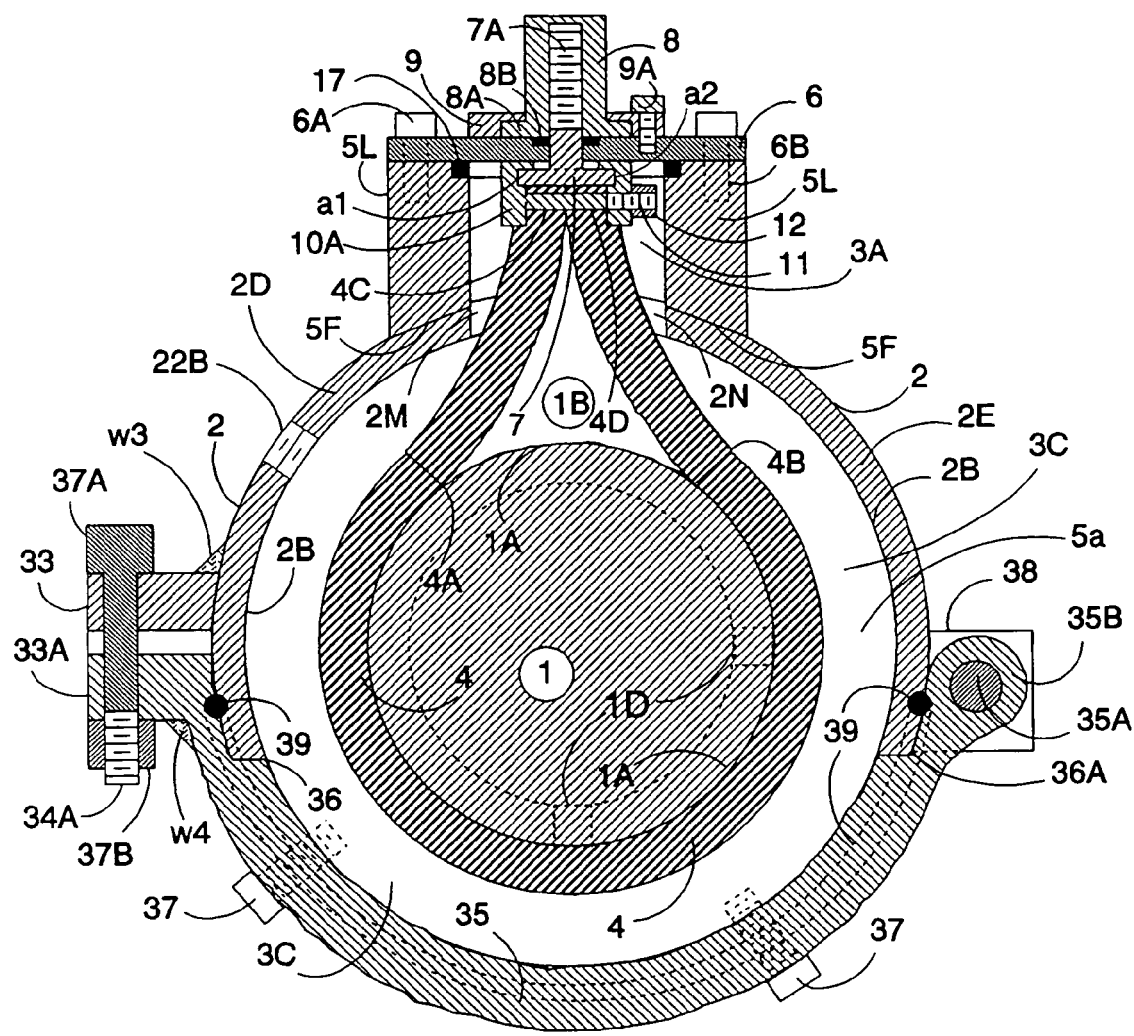
FIG. 7 is similar to FIG. 1, except that the cylindrical cover is modified so that an arcuate portion of the cover can be swung about a hinge, so that half of the inner cavity can be exposed.

FIG. 7 is similar to FIG. 1, but the cylindrical cover 2 is modified so that half of the inner cavity can be exposed, by swinging open an arcuate portion cover 35. The cover 35 swings around a hinge (similar to a door hinge; the full length side view of which is not depicted in any of the FIGS.) shown by a pivoted bolt stem 35A, which acts as the hinge pin, and a plurality of mating parts 35B and 38, which act as the two sets of knuckles of the hinge. One of these two sets of hinge knuckles, 38, is comprised of a plurality of radial flanges emerging from cover 2. The other set of knuckles, 35B, is comprised of a plurality of circular shaped rotatable joints around 35A emerging from arcuate portion cover 35. Cover 35 is designed to fit and cover the gap of cover 2 between 36 and 36A. Flange 33 is welded to 2 by means of weld W3. The integral or welded flange 33A of 35 is connected to flange 33 by means of a plurality of bolts 37A. Nuts 37B are provided for the threaded ends 34A of the bolts. The weld of flange 33A to 35 is depicted by W4. If required by design, additional bolts 37 may be driven into radial walls 5 and 5a. A saddle seal 39 is provided against fluid leakage. It is shown that threaded opening 22B can be located next to the enclosure box 5L. The rest of FIG. 6 was explained earlier.

FIG. 8 is similar to FIG. 7, except that two split arcuate covers 35 and 35e are provided for the valve. These covers can be swung apart by means of two separated hinges (similar to a door hinges; the full length side views of which are not depicted in any of the FIGS.), where each hinges is constructed in a manner similar to the hinge described in FIG. 7. The two pivoted bolts for said hinges are shown by 35A and 35C, and both bolts act as hinge pins. At regularly spaced intervals, at a distance from each other, a plurality of radial flanges 38, having circular openings for pins 35A and 35C, emerge from an arcuate platform bridge 2f between the bridge's two opposite sides 2J and 2K, and act as knuckles for the two said separate hinges. Said platform bridge 2f, with the use of its integrated emerging flanges 38, accommodates two sets of knuckles, 35B and 35g, which knuckles are integrated with arcuate covers 35 and 35e respectively, and through which knuckles the before mentioned hinge pins 35A and 35C are passed, to complete the hinges.

Said arcuate platform bridge 2f, which lies between its two opposite sides 2J and 2K, acts as an arcuate bridge between radial walls 5 and 5a, by spanning the space between said radial walls. One end of said platform bridge 2f is connected to, and integrated with, the inner face of radial wall 5, while the other end of said platform bridge 2f is connected to, and integrated with, the inner face of radial wall 5a. Though the expanse of this arcuate platform bridge 2f, and its connections to radial walls 5 and 5a, are not depicted in any of the FIGS., it is clear that said arcuate platform bridge runs in an axial direction, parallel to the axis of the valve, and it is concentric with the inner valve body and is also concentric with the two arcuate covers 35 and 35e.

Similar to platform bridge 2f, is platform bridge 2F, situated on the opposite side of the valve. All that has been said in describing platform bridge 2f also applies to 2F, except that, in addition to being positioned on the opposite side of the valve, 2F does not include any radial flanges to act as knuckles in a hinge. Platform bridge 2F is not used as part of a hinge. Said platform bridge 2F, which lies between its two opposite sides 2h and 2g, acts as a bridge between radial walls 5 and 5a, by spanning the space between said radial walls. One end of said platform bridge 2F is connected to, and integrated with, the inner face of radial wall 5, while the other end of said platform bridge 2F is connected to, and integrated with, the inner face of radial wall 5a. Though the expanse of this platform bridge 2F, and its connections to radial walls 5 and 5a, are not depicted in any of the FIGS., it is clear that said arcuate platform bridge runs in an axial direction, parallel to the axis of the valve, and it is concentric with the inner valve body and is also concentric with the two arcuate covers 35 and 35e.

Flanges 33 and 33A, which are joined together by a plurality of bolts 37A, are situated on the side of the valve opposite that of the before mentioned hinges. The threaded ends of the bolts and nuts are depicted by 34A and 37B. In their closed position, bolted flanges 33 and 33A secure covers 35e and 35, respectively, against platform bridges 2f and 2F. The "bridges" 2f and 2F, between walls 5 and 5a, now act as "platforms" for covers 35e and 35 to rest against, when said covers are in closed position, as shown. The contact areas between cover 35e and platform bridges 2f and 2F, when cover 35e is in closed position, is shown as 36e and 36d, respectively. Similarly, the contact areas between cover 35 and platform bridges 2f and 2F, when cover 35 is in closed position, is shown as 36A and 36, respectively.

The enclosure box 5L is integrated with cover 35e. The diaphragm can be pulled out before cover 35e is swung open. Swinging cover 35e open also swings enclosure box 5L away from its closed position. Optional radial flanges f2 and f1, on both sides of the arcuate covers 35e and 35, may be provided, which will overhang radial walls 5 and 5a of the valve for added strength or stability. The threaded opening 22B, described earlier, can also be located next to enclosure box 5L. Two saddle seal gaskets, indicated by 39 and 39A, are used to prevent fluid leakage from the valve body.

A modified version of a tie assembly is shown only in FIG. 8. Plate 10A, described in previous FIGS., is now modified to be a plain plate, shown as 10d, and plate 10 is modified to be the plate shown as plate 10e, and rectangular bolt head 7 is modified to be a rectangular bolt head vertical plate 7d, which is provided with a plurality of openings 7e through which bolts can be passed, while also being passed through the plurality of openings 4C and 4D though diaphragm 4 (to accommodate the multiple tie bolts 11, described earlier and shown in FIG. 2). Thus it is clear that two opposite ends of diaphragm 4 can be doubled up against vertical plate 7d and they can be tied by the new version of tie assembly.

FIG. 9 is the same as FIG. 2, except that it shows no actuator, it shows a spring roller, depicted by Z7 and Z8, and it shows a modified, second version of diaphragm 4. The spring rollers were discussed under FIG. 6. The second version of diaphragm 4 has a different seal gasket design which allows the diaphragm to remain in contact of the opposite walls, 5 and 5A, of the valve.

The second version of diaphragm 4 will be discussed with the aid of both FIG. 9 and FIG. 10. FIG. 10 is a transverse section through the doubled up diaphragm in FIG. 1 taken between bolt head 7 and one of the tie bolts 11, looking toward the center of the valve. The seal gasket tubes, shown by 4G and 4H, always remain charged with fluid from cavity 3A, and their outer free movable walls 4J and 4K always remain in contact with radial walls 5 and 5a, respectively, and with the inner opposite surfaces 5K of box 5L. The tie plates are placed between the outwardly protruding flanges K1 and K2. As was pointed out earlier, depending on the thickness of diaphragm 4, sides K1 and K2 may or may not protrude beyond the thickness of diaphragm 4.

FIG. 10 shows the relative positions of the doubled up diaphragm ends that are tied together by means of a tie assembly in the enclosure box 5L, where the inner surfaces of walls 5 and 5a are depicted by 5G and 5H. FIG. 10 shows two opposite, preferably metallic, plates 10A and 10, held together by means of a plurality of integral bolts 11 (where said bolts 11 are integral to plate 10A) and nuts 12, by crossing bolts 11 through multiple openings 4C, and through corresponding opposite multiple openings 4D, in the end portions of diaphragm 4. The rest of diaphragm 4 was discussed under FIG. 9. It is pointed out here that the doubled up ends of the diaphragm and the tie assembly are kept as close to the top opening of the box as practical, and the size of the box is designed so that the tie assembly is easy to use.

FIG. 11 shows a partial view of FIG. 9, and includes two guiding arms 7L, each made of a rod that is integrated with rectangular longitudinal bolt head 7. Rods 7L are movably situated in cylindrical tubes 6M integrated with cover 6. This arrangement of FIG. 11 can be used to provide added stability to the movement of the tie assembly in large sized valves where the width between walls 5 and 5a is considerably long.

FIG. 12 shows a vertical section of the reinforced sheet diaphragm 4, differing only in the side seal gaskets of the diaphragm, from those depicted in FIGS. 2 and 9. The reinforcement is depicted by 4Z. The original numeric labels, except 4P and 4R, to describe the features of diaphragm 4, are retained, and they retain the same functions as well. Two types of seal gaskets are depicted, where integral seal gasket 4P is an arcuate projection, and integral seal gasket 4R, shown on the opposite side, is a "V" shaped projection. Seals 4P and 4R are surrounded by fluid from both sides of diaphragm 4, and they minutely flex when the diaphragm is moved slidingly against the opposite outer walls of the valve. The rest of diaphragm 4 was explained previously.

FIG. 13 is the same as FIG. 12, except that the seal gaskets 4P and 4R are not even in elevation with 4T as is the case in FIG. 12, and where, instead, they project outward, beyond the elevation of 4T. The original numeric labels, except 4P and 4R, to describe the features of the of diaphragm 4, are retained, and they retain the same functions as well. Two types of seal gaskets are depicted, where integral seal gasket 4P is an arcuate projection, and integral seal gasket 4R, shown on the opposite side, is a "V" shaped projection. Seals 4P and 4R are surrounded by fluid from both sides of the diaphragm 4, and they minutely flex when the diaphragm is moved slidingly against the opposite outer walls of the valve. The rest of diaphragm 4 was explained previously.

Figure 14:
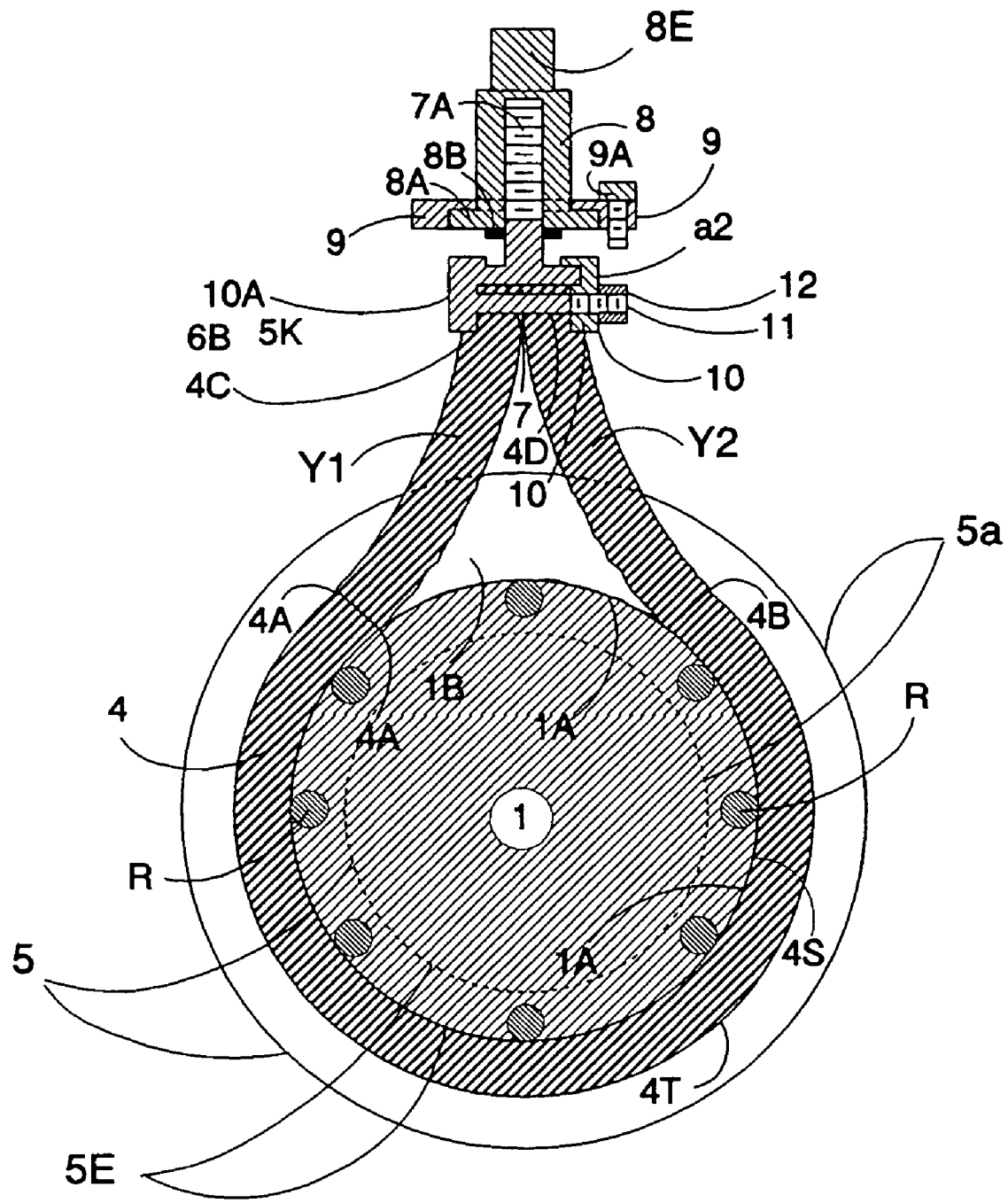
FIG. 14 Shows the valve body by removing the outer cover and the enclosure box.

FIG. 14 depicts the inner valve body without showing the outer valve cover or the enclosure box for diaphragm 4. Unlike in other FIGS., the partition plate 1 of FIG. 14 is integrated with a plurality of rods R, rather than with the slotted cylinder Z1 that is shown in other FIGS. Rods R are also integrated with the opposite radial walls 5 and 5a. This allows the inner body of the valve to be fabricated with nothing more than rods, instead of with a whole cylinder, if desired.

FIG. 15 is the same as FIG. 3, but opening D in cover 3 has been removed, two gaskets (the gasket around stem 7A in lid 6, and gasket 26 in piston 24) have been removed, and the diameter of piston 24 has been shortened to pressurize the variable cavity between piston 24 and cover C with the same fluid pressure as that in cavity 3B. Frictional losses of the seal gaskets are eliminated for the smooth and quick movement of the piston and the diaphragm. The valve in FIG. 15 is operated as back flow (check) valve. In this case, opening 22 is kept closed, and openings 22A and 22B are kept fluidly communicative. The valve opens when a predetermined up stream fluid pressure is achieved in the pipe line. Reverse flow in the valve is shut off when the reverse flow pressure itself pressurizes cavities 3C, 3A and 3B, and when the resulting pressure, added to the pressure on the diaphragm exerted by spring 29, causes diaphragm 4 to close around seat 1A. Piston 24 is provided key hole 24A for a key wrench to mount the piston around stem 7A and to disengage the piston from 7A. Though not shown, hole 24A will also be provided for the pistons in FIGS. 3 and 4. The rest of the valve was explained earlier.

Figure 16:
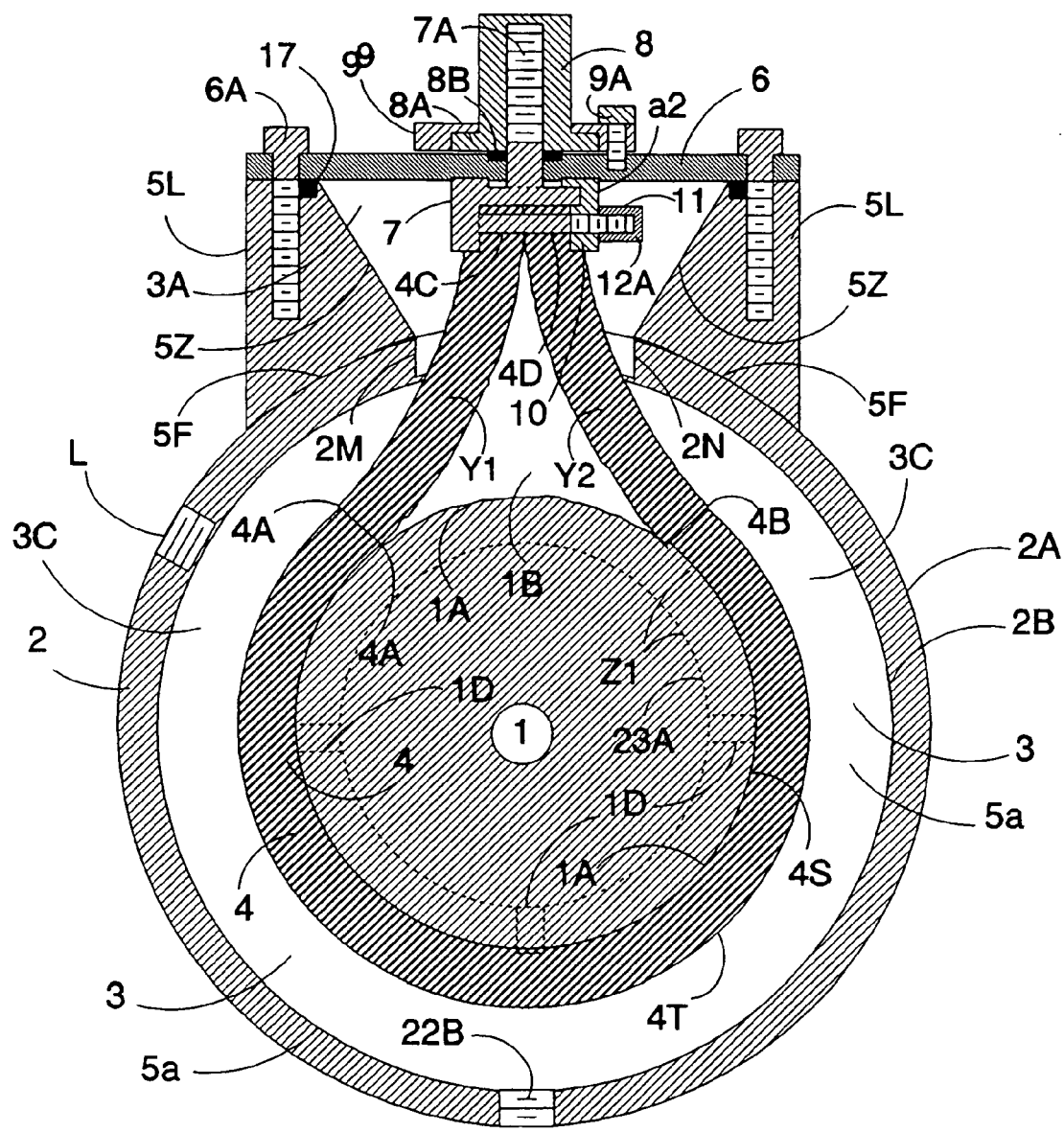
FIG. 16 is a modified version of FIG. 1.

FIG. 16 depicts a modified version of the enclosure box 5L in FIG. 1, where the inner faces 5Z of two opposite walls, running parallel to the axis of the valve, are slanted outwardly away from the center of the valve. The rest of FIG. 16 was explained earlier. This version of enclosure box makes it easier to mount the diaphragm 4 around seat 1A, and also make it easier to dismount the diaphragm.

It is also understood that adjuster rollers shown in FIGS. 6, 9 and 11 may not be provided, in all sizes of valves, especially in the case of small size valves.

It will be understood that any other types of seal gaskets can be used wherever they may be needed. Also, bearings packing can be added, as desired, around the actuating stem of the actuators. It is understood that, to access fluid from opening 22, openings 22B and 22A may be located in any suitable locations and are not limited to those locations shown in the drawings.

It is clear that the closing and opening of sheet diaphragm 4 can be controlled by means of various diaphragm actuators, in tandem with other fluid control means presented in the drawings, to control the flow of fluid through the valve body, where sheet diaphragm 4 is situated around the cylindrical slotted seat 1A. It is understood that the length of the sheet diaphragm 4 will depend on the designed stroke of the valve.

Whereas this invention is here illustrated and described with specific references to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow:

I claim:

1. A free floating diaphragm flow control valve comprising:

a cylindrical outer valve body (2) with its two opposite ends (5, 5a) joined radially to a concentric cylindrical inner body (Z1), and with a partition plate (1) in the inner cylindrical body, dividing said inner body into two portions, an interior cylindrical inlet chamber (A) in the first portion of said inner cylindrical body, having open end (E1) for connection to the up stream pipe, an interior cylindrical outlet chamber (B) in the second portion of said inner cylindrical body having open end (E2) for connection to the down stream pipe, a cylindrical cavity (3) created between the cylindrical wall of outer cylindrical body (2) and concentric seat (1A) for diaphragm (4), where said seat (1A) is provided by the wall of inner cylindrical body (Z1), slotted openings (1C, 1D) through the cylindrical wall of the inner cylindrical body (Z1) on both sides of the partition plate (1) where said slots fluidly connect the cylindrical cavity (3) to the interior cylindrical inlet chamber (A) on one end of the partition plate (1) and to the interior outlet cylindrical chamber (B) on the other side of the partition plate (1) of the valve body, a enclosure box (5L) to accommodate the doubled up ends of the diaphragm (4) and a tie assembly (7A; 7; 10A; 11; 12), a lid (6) to cover the outer opening of the receptacle enclosure box (5L), an elastomeric rectangular sheet diaphragm (4) positioned in the cylindrical cavity (3) between the two cylindrical walls of the inner and outer cylindrical bodies (2, Z1), and partially encircles the cylindrical seat (1A) to control fluid flow through a plurality of slotted openings (1C, 1D) provided in the inner cylindrical body Z1, and its two opposite corresponding end portions (Y1, Y2) extend convergingly outward away from the center of the valve into cavity 3A of the enclosure box, where its two doubled up ends are tied together by means of a tie assembly (7A; 7; 10A; 11; 12)

means (22, 22B) to pressurize and means (22B, 22A) to depressurize the looped diaphragm (4), to allow or to block fluid flow, from the inlet chamber (A) to the outlet chamber (B), means (8) to actuate the diaphragm (4) by working in tandem with the pressure inside and outside of the loop of diaphragm 4.

2. A free floating diaphragm flow control valve according to claim 1, wherein flow through the valve is blocked when the diaphragm (4) is pressurized against the slotted openings (1C, 1D) to close the slots in seat 1A.

3. A free floating diaphragm flow control valve according to claim 2, wherein the means to pressurize and depressurize the diaphragm controls flow through the valve in tandem with an actuator.

4. A free floating diaphragm flow control valve according to claim 3, wherein the diaphragm forms two chambers, a flow chamber and a control chamber.

5. A free floating diaphragm flow control valve according to claim 4, wherein the flow chamber is formed between seat 1A and inner diaphragm surface (4S), and the control chamber (3C) is formed between outer surface (4T) of the diaphragm and outer cover of the valve.

6. A free floating diaphragm flow control valve according to claim 5, wherein the flow chamber and the control chamber are formed when the doubled up ends of the diaphragm (4) are secured by means of a tie assembly.

7. A free floating diaphragm flow control valve according to claim 6, wherein the tie assembly is situated in the enclosure box (5L), and an integrated threaded stem (7A), of the tie assembly, passes through an opening (6E) in the center of a secured lid (6) into the actuator (8) which actuator radially actuates the tie assembly along with the diaphragm.

8. A free floating diaphragm flow control valve according to claim 7, wherein the stem (7A) of an actuator is integrated with the tie assembly, and is actuated by means of an stationary, rotatable, flanged housing nut (8) having internal threads, that is rotatably mounted around threaded portion of the stem (7A) to raise or to lower the tie assembly along with the diaphragm.

9. A free floating diaphragm flow control valve according to claim 8, wherein the flange (8A) of the flanged cap (8) mounted over the seal gasket (8B) held to the lid cover (6) is rotatably secured by means of housing cap (9) joined to the lid cover by means of bolts (9A).

10. A free floating diaphragm flow control valve according to claim 1, wherein free sides of the diaphragm, always remain movably and sealingly in touch with the two opposite radial walls of the valve.

11. A free floating diaphragm flow control valve according to claim 10, wherein the sides of the diaphragm in touch with the opposite radial walls are integral seal gaskets of the diaphragm which are activated by the fluid.

12. A free floating diaphragm flow control valve according to claim 11, wherein integral seal gaskets of the diaphragm are included as an integral part of the diaphragm, and which seal gaskets are sensitive to the fluid pressure on both sides of said seal gaskets, in such a way as to prevent fluid from passing freely between the diaphragm and the walls that said diaphragm sides are in contact with.

13. A free floating diaphragm flow control valve according to claim 8, wherein the actuator is a Type One actuator (8), which works in tandem with pressures inside and outside of the diaphragm loop to actuate the diaphragm, and the actuating mechanism for which is a stationary rotatable actuator nut (8) working with the threaded portion (7A) of the integrated bolt (7) in the tie assembly.

14. A free floating diaphragm flow control valve according to claim 8, wherein the actuator is a Type Two actuator, which works in tandem with pressures inside and outside of the diaphragm loop to actuate the diaphragm, and the actuating mechanism of the actuator is located inside of open ended cylinder (6H) with base (6), and said mechanism is comprised of a circular piston disc (24) having a circular seal gasket in its periphery to create variable cavity for a spring 29 and pressurized fluid, between said piston disc and said base of the actuator, and said circular cavity (3B) is fluidly communicative with the control chamber cavity 3C, through openings in base (6), around the diaphragm (4), where unbalanced pressure around the diaphragm, in favor of the biased spring, can close the diaphragm around the diaphragm seat (1A).

15. A free floating diaphragm flow control valve according to claim 14, wherein the open ended cylindrical housing (6H) for the piston disc (24) is closed by means of a cover plate (C) having a threaded opening (D) at the center of said cover plate to accommodate a removable bolt drive (not shown), which bolt drive is used to advance the piston disc towards the center of the valve to open the valve, and where cover plate (C) is held in place by a plurality of bolts (27), and where the base (6) of the cylindrical housing (6H) is connected to the walls of the outer opening of the enclosure box (5L) to close said opening of the enclosure box.

16. A free floating diaphragm flow control valve according to claim 14, where the Type Two actuator has been modified to create a pneumatic actuator, which works in tandem with pressures inside and outside of the diaphragm loop to actuate the diaphragm, and the actuating mechanism of the actuator is located inside of an open ended cylinder (6H) with a base (6), and said mechanism is comprised of a circular piston disc (24) pressurized or depressurized by means of openings (D, E) connected to an external pressurizing and depressurizing source, and a spring (29) loaded in a variable circular cavity (3B) created between said piston disc and said base of the actuator, and said circular cavity (3B) is not fluidly communicative with the cavity 3C around the diaphragm (4), where unbalanced pressure around the diaphragm, in favor of the biased spring, can close the diaphragm around the diaphragm seat (1A).

17. A free floating diaphragm flow control valve according to claim 1, wherein the converging end portions (Y1, Y2) of the diaphragm are positioned between two adjuster rollers (Z5, Z7) to create a predetermined amount of gap between end portions (Y1, Y2) of the diaphragm, where said two adjustor rollers are mounted between two opposite walls of the valve.

18. A free floating diaphragm flow control valve according to claim 7, wherein the tie assembly is situated in the enclosure box (5L), and an integrated threaded stem (7A), of the tie assembly, passes through an opening (6E) in the center of a secured lid (6) into the actuator (8) which actuator radially actuates the tie assembly along with the diaphragm, and wherein a seal (17), between lid (6) and open walls of the enclosure box (5L), and another seal between the flange of drive nut (8) and cover (6) are provided to block any leakage of fluid through the valve body.

19. A free floating diaphragm flow control valve according to claim 15, wherein the open ended cylinder (6H) for the piston disc (24) is closed by means of a cover plate (C) having a threaded opening (D) at the center of said cover plate to accommodate a bolt drive (not shown), which bolt drive is used to advance the piston disc towards the center of the valve to open the valve, and where cover plate (C) is held in place by a plurality of bolts (27), and where the base (6) of the cylindrical housing (6H) is connected to the walls of the outer opening of the enclosure box (5L) to close said opening of the enclosure box, and wherein a seal is provided between base (6) and open walls of the enclosure box, and a seal (28) between cover plate (C) and outer opening of cylinder (6H) is provided to block leakage of fluid from the valve body; and a seal around piston disc (24), to operate the piston, is also provided.

20. A free floating diaphragm flow control valve according to claim 14, wherein the actuator is a Type Two actuator, which works in tandem with pressures inside and outside of the diaphragm loop to actuate the diaphragm, and the actuating mechanism of the actuator is located inside of an open ended cylinder (6H) with a base (6), and said mechanism is comprised of a circular piston disc (24) provided with a gap between the periphery of said disc and the cylindrical wall of the housing cylinder 6H, and a spring (29) is loaded in a variable circular cavity (3B) created between said piston disc and said base of the actuator, and said circular cavity (3B) is fluidly communicative with the control chamber cavity 3C, through openings in the base (6), around the diaphragm (4), and where unbalanced pressure around the diaphragm, in favor of the biased spring, can close the diaphragm around the diaphragm seat (1A).

21. A free floating diaphragm flow control valve according to claim 20, wherein the opened end of the cylindrical housing (6H) for the piston disc (24) is closed by means of a solid cover plate (C), by placing a seal gasket (28) between said solid cover plate and the opened ended cylindrical wall of the cylindrical housing, and where cover plate (C) is held in place by a plurality of bolts (27), and where the base (6) of the cylindrical housing (6H) is connected to the walls of the outer opening of the enclosure box (5L) to close said opening of the enclosure box.

22. A free floating diaphragm flow control valve according to claim 1, wherein the means (8) to actuate the diaphragm (4), by working in tandem with the pressure inside and outside of the loop of diaphragm 4, is a bolt (7; 7A) shared by the actuator means (8) and the tie assembly for the diaphragm 4, where the threaded portion of the stem (7A) of the bolt is actuated radially upward or downward by the housing nut (8) of the actuator, which housing nut is situated outside the lid cover for enclosure box 5L, and where rectangular bolt head (7) of the bolt is integrated with the tie assembly, to tie together the two doubled up ends of the diaphragm 4, situated in the enclosure box 5L.

* * * * *